United States Patent
Chung

(10) Patent No.: US 6,325,665 B1
(45) Date of Patent: Dec. 4, 2001

(54) POWER ADAPTER WITH CABLE STORAGE DEVICE

(76) Inventor: Yu-Lin Chung, No4, Lane 130, Nan-Kang Rd, Sec 3, Taipei (TW)

( * ) Notice: Subject to any disclaimer, the term of this patent is extended or adjusted under 35 U.S.C. 154(b) by 0 days.

(21) Appl. No.: 09/557,658

(22) Filed: Apr. 25, 2000

(51) Int. Cl.$^7$ .................................................. H01R 13/72
(52) U.S. Cl. .............................................................. 439/501
(58) Field of Search .................................... 439/501, 502, 439/106, 623, 369

(56) References Cited

U.S. PATENT DOCUMENTS

| | | | |
|---|---|---|---|
| 5,494,446 | * | 2/1996 | DeLucia et al. ...................... 439/501 |
| 5,671,833 | * | 9/1997 | Edwards et al. ..................... 439/501 |
| 6,077,108 | * | 6/2000 | Lorscheider et al. ................ 439/501 |

* cited by examiner

*Primary Examiner*—Paula Bradley
*Assistant Examiner*—Shanetta Ore

(74) *Attorney, Agent, or Firm*—Pro-Techtor International Services

(57) ABSTRACT

A power adapter includes a body having an upper portion on which a first plug is formed for connection with a wall outlet and a lower portion defining a recess with an axle formed therein for rotatably supporting a reel. A lid is attached to the body for covering the recess. The reel includes a first disk and a second disk mounted together with a coil spring received therebetween. The coil spring biases the reel in a winding direction for winding a cable thereon. The cable has a first end extending through a central bore of the axle and electrically connected to the first plug and a second end extending beyond the body through an opening defined in the body. A second plug is formed on the second end for connection with an electrical device. The cable may be extended out of the body by being pulled in an unwinding direction against the coil spring. A locking slide is mounted on the body and movable between a closed position and an open position. The locking slide forms a pawl engageable with the cable when the slide is moved to the closed position thereby securing the cable in position.

4 Claims, 4 Drawing Sheets

POWER ADAPTER WITH CABLE STORAGE DEVICE

FIELD OF THE INVENTION

The present invention generally relates to a power adapter for connection between a wall outlet and an electrical device, such as a mobile phone and a notebook computer. More particularly, the present invention relates to a power adapter having a cable storage device for storage of a cable thereof.

BACKGROUND OF THE INVENTION

A portable electrical device is often powered by an internal power source, such as a battery set. The internal power source which is usually a rechargeable battery set requires recharging. Thus, a power adapter is used to connect the portable electrical device to an electrical main, such as a wall outlet, for recharging the internal power source or directly powering the portable electrical device.

FIG. 4 of the attached drawings shows a conventional power adapter. The power adapter comprises a body 100 on which an input plug 200 is formed for connection with a wall outlet (not shown). A cable or cord 300 having a first end electrically connected to the input plug 200 extends from the body 100 with a remote second end forms an output plug 400 for connection with a portable electrical device. A disadvantage of the conventional power adapter is that the cable 300 is completely located outside the body 100. This may cause problem to a user of the portable electrical device. The cable is often tied together by a rope or a rubber band. It is inconvenient to the user.

Thus, it is desired to have a power adapter having a cable storage device for overcoming the above problems.

SUMMARY OF THE INVENTION

Accordingly, an object of the present invention is to provide a power adapter having a cable storage device for advantageously storing an extension cable therein, the cable being readily extended for connection with an electrical device.

Another object of the present invention is to provide a power adapter with an extension cable stored inside a body thereof, the cable being arbitrarily extendible for ready use.

In accordance with the present invention, there is provided a power adapter comprising a body having an upper portion on which a first plug is formed for connection with a wall outlet and a lower portion defining a recess with an axle formed therein for rotatably supporting a reel. A lid is attached to the body for covering the recess. The reel comprises a first disk and a second disk mounted together with a coil spring received therebetween. The coil spring biases the reel in a winding direction for winding a cable thereon. The cable has a first end extending through a central bore of the axle and electrically connected to the first plug and a second end extending beyond the body through an opening defined in the body. A second plug is formed on the second end for connection with an electrical device. The cable may be extended out of the body by being pulled in an unwinding direction against the coil spring. A locking slide is mounted on the body and movable between a closed position and an open position. The locking slide forms a pawl engageable with the cable when the slide is moved to the closed position thereby securing the cable in position.

BRIEF DESCRIPTION OF THE DRAWINGS

The present invention will be apparent to those skilled in the art by leading the following description of preferred embodiments thereof, with reference to the accompanying drawings, in which.

DETAILED DESCRIPTION OF THE PREFERRED EMBODIMENT

Figure 1:
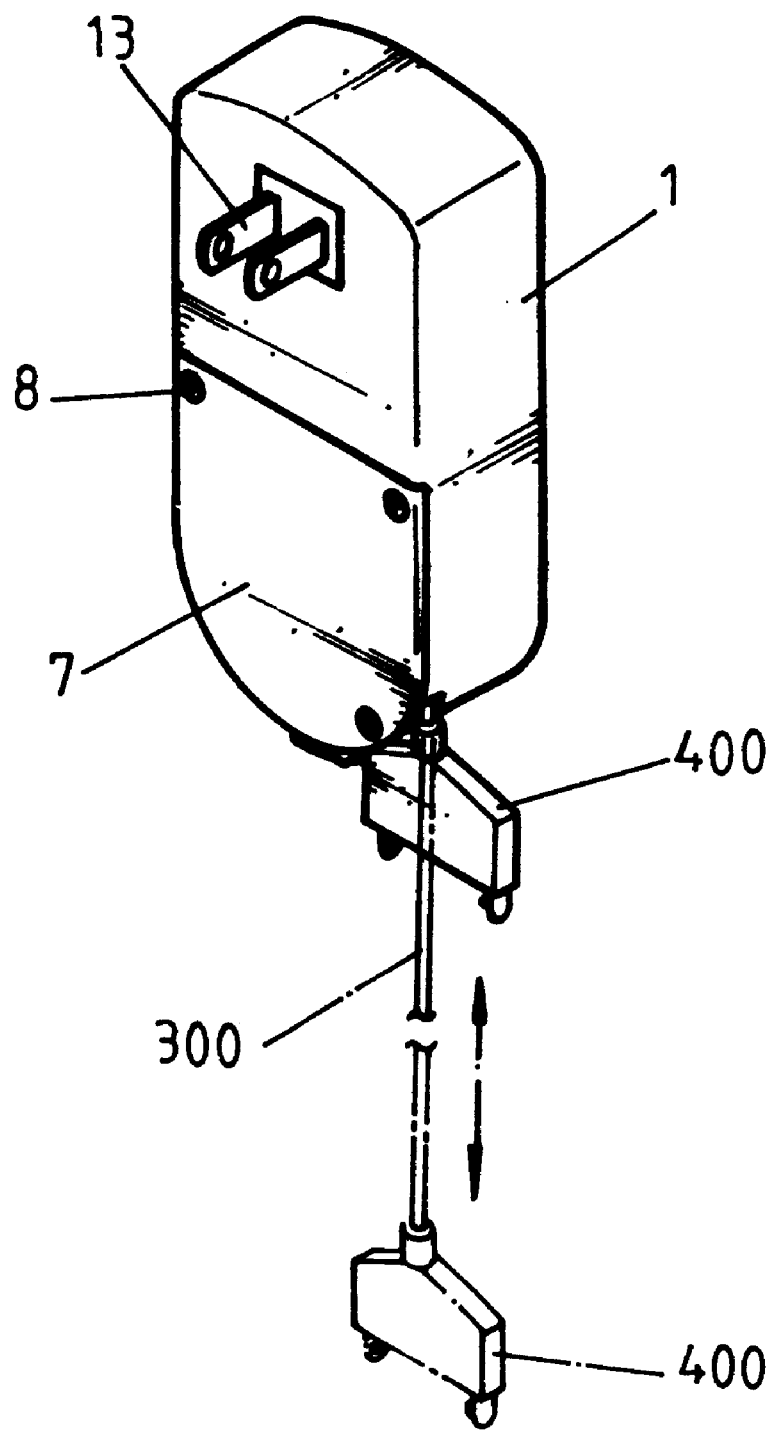
FIG. 1 is a perspective view of a power adapter constructed in accordance with the present invention.
Figure 2:
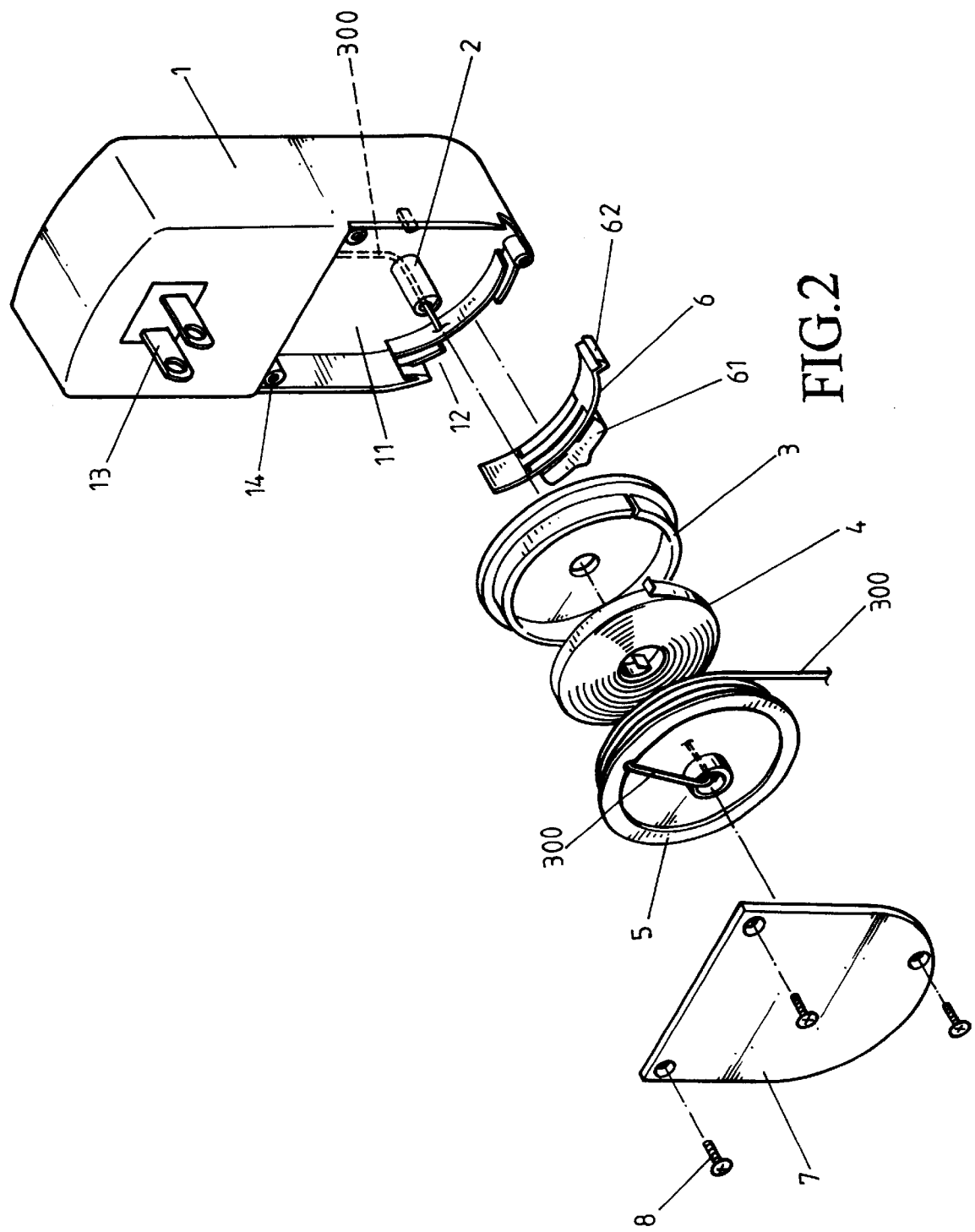
FIG. 2 is an exploded view of the power adapter of the present invention.

With reference to the drawings and in particular to FIGS. 1 and 2, wherein a power adapter constructed in accordance with the present invention is shown, the power adapter comprises a body 1 having an upper portion on which a first plug 13 is formed for connection with for example a wall outlet (not shown) and a lower portion defining an interior space 11 covered by a removable lid 7. The lid 7 is attached to the body 1 by any know means, such as bolts 8 engageable with inner-threaded holes 14 formed in the interior space 11.

A reel assembly is rotatably supported in the interior space 11 of the body 1 with a cable 300 wound thereon. The reel assembly comprises a first disk 5 and a second disk 3 coaxially mounted to each other for defining a space therebetween to receive a coil spring 4 for biasing the reel assembly in a winding direction. An axle 2 is mounted inside the interior space 11 and extends through central bores defined in the disks 5 and 3 for rotatably supporting the reel assembly.

An inner end of the cable 300 extends through a central bore (not labeled) of the axle 2 for being electrically connected to the first plug 13. A portion of the cable 300 is wound between the disks 5 and 3 with an outer end of the cable 300 extending beyond the body 1 whereby when a user pulls the outer end of the cable 300, the reel assembly rotates in an unwinding direction against the coil spring 4 for extending the cable 300 as shown by phantom lines of FIG. 1. A second plug 400 is mounted on the outer end of the cable 300 for connection to an electrical device whereby electrical power is supplied from the wall outlet through the cable 300 to the electrical device.

When the cable 300 is released, the coil spring 4 which exerts a biasing force on the reel assembly in the winding direction forces the reel assembly to rotate in the winding direction thereby retracting the cable 300 into the interior space 11 of the body 1.

Figure 3:
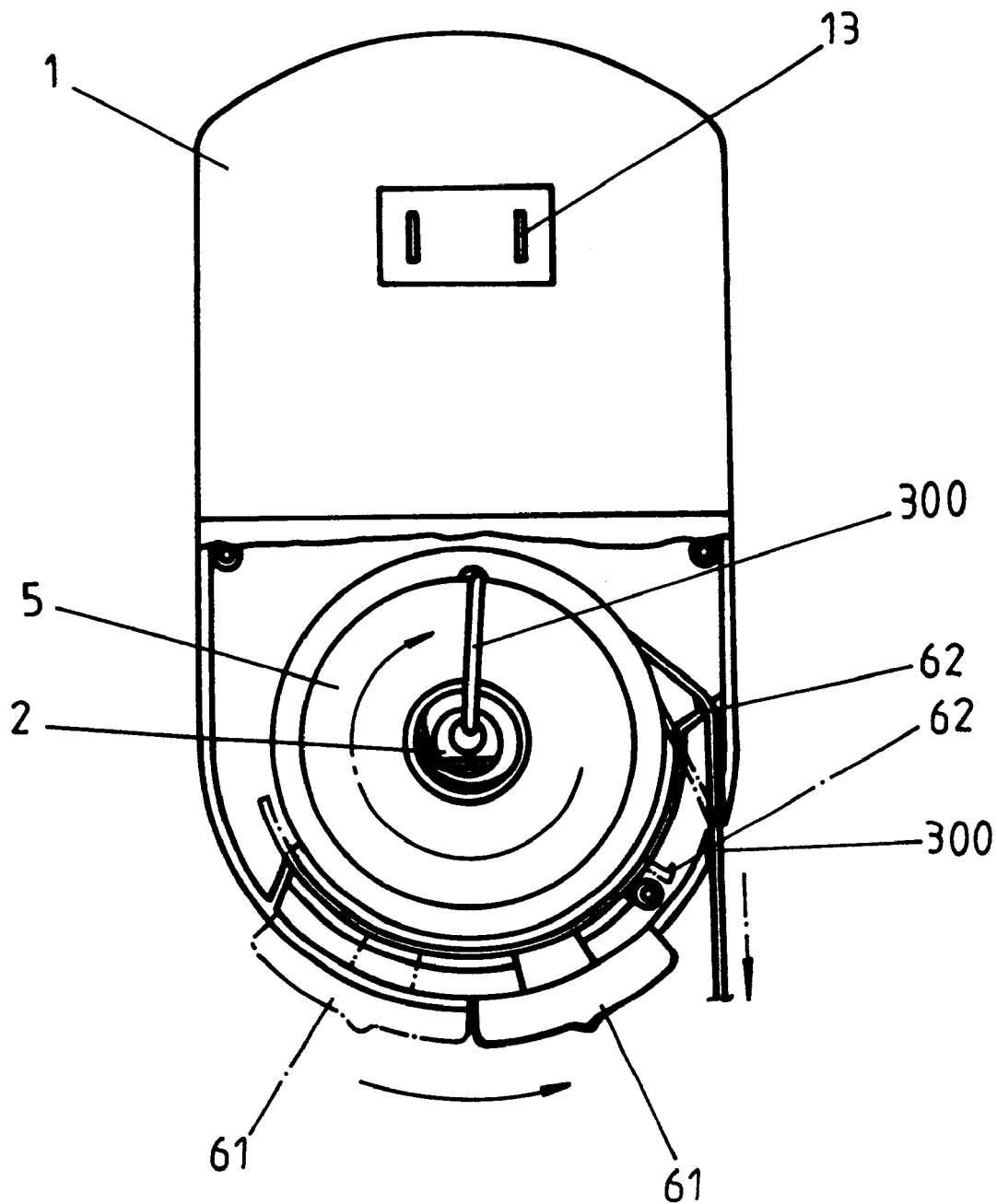
FIG. 3 is a front view of the power adapter with a lid removed to show inside details.
Figure 4:
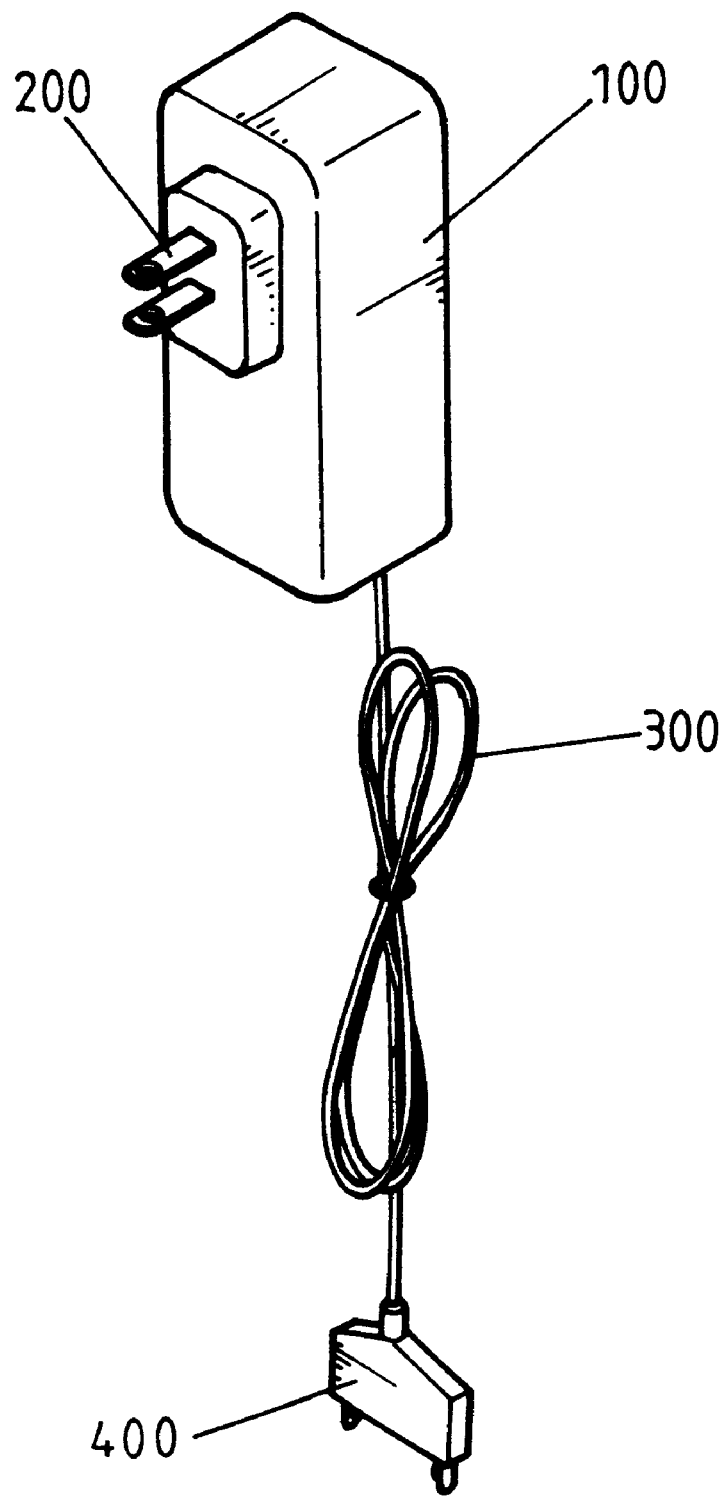
FIG. 4 is a perspective view of a conventional power adapter.

Also referring to FIG. 3, a race 12 is defined in the body 1 for receiving a slide 6 therein. The slide 6 is movable in the race 12 between a closed position and an open position. A projection 61 is formed on the slide 6 for facilitating manually moving the slide 6 in the race 12. An opening (not labeled) is defined in the body 1 through which the cable 300 extends. The opening is located next the race 12 whereby when the slide 6 is moved to the closed position, a pawl 62 formed on the slide 6 engages and thus fixes the cable 300 and when the slide 6 is moved to the open position, the cable 300 is released.

To this point, it is understood that the present invention allows a user to arbitrarily extend the cable 300 by pulling the cable 300 against the coil spring 4 and to fix the cable 300 in position by using the slide 6.

Although the present invention has been described with respect to the preferred embodiments, it is contemplated that a variety of modifications, variations and substitutions may be done without departing from the scope of the present invention that is intended to be defined by the appended claims.

What is claimed is:

1. A power adapter comprising a body on which a first plug is formed, the body defining an interior space with a reel rotatably supported therein, said reel comprising a first disk and a second disk coaxially mounted with a biasing means therebetween, a cable being wound around the reel and having a first end electrically connected to the first plug and a second end extending beyond the body, a second plug being formed on the second end of the cable, the reel being rotatable in a first direction to unwind the cable therefrom thereby allowing the cable to extend outside the body and rotatable in an opposite second direction to wind the cable and thus retract the cable into the body, the biasing means biasing the reel in the second direction, the power adapter converting AC power to DC power to power a portable electrical device.

2. The power adapter as claimed in claim 1, wherein an opening is defined in the body for the extension of the cable, locking means being formed on the body adjacent the opening for engaging and thus fixing the cable in position when the cable is released out of the body.

3. The power adapter as claimed in claim 2, wherein the locking means comprises a slide movable between a closed position and an open position, the slide having an end with a pawl formed thereon for engaging the cable when the slide is moved to the closed position.

4. The power adapter as claimed in claim 1, wherein the biasing means comprises a coil spring.

* * * * *